Jan. 26, 1960 A. G. BALE, JR 2,922,610
AUTOMATIC CONTROL FOR MATERIAL DISTRIBUTION
Filed Nov. 29, 1957
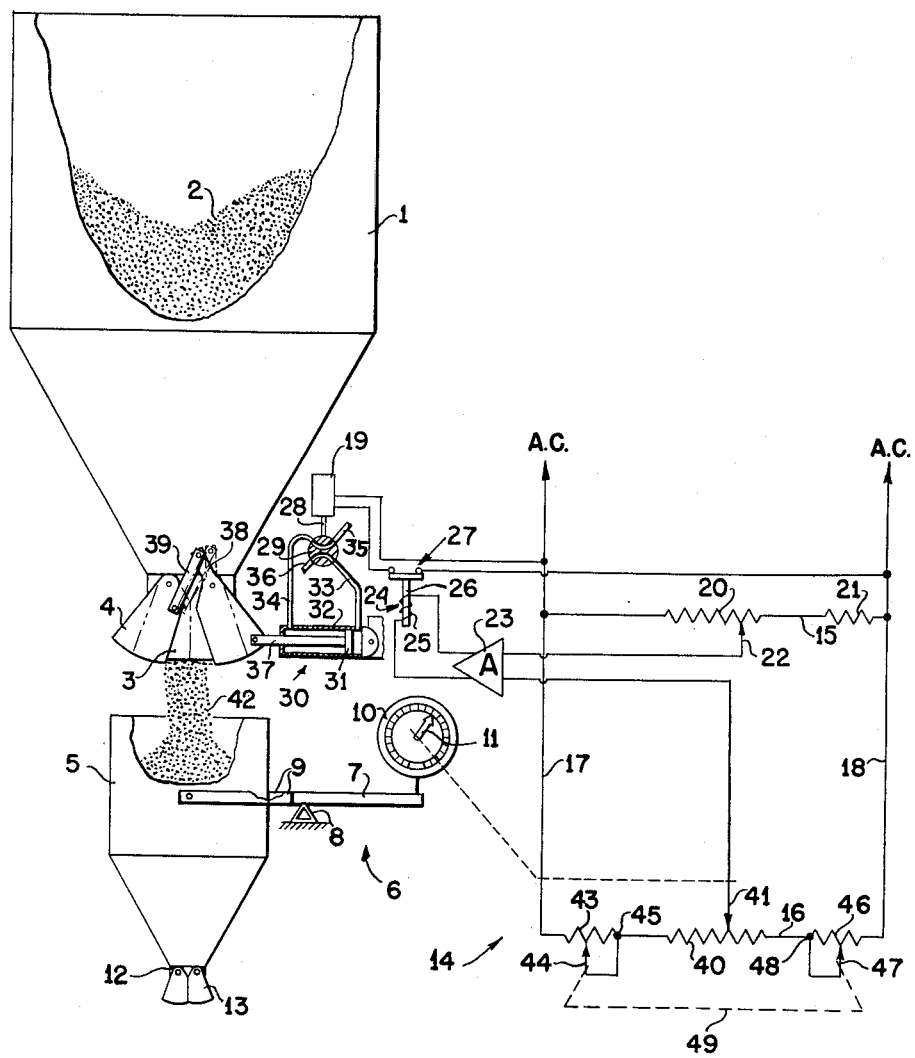
INVENTOR.
ALTON G. BALE, Jr.
BY
ATTORNEYS United States Patent Office 2,922,610
Patented Jan. 26, 1960

2,922,610
AUTOMATIC CONTROL FOR MATERIAL DISTRIBUTION

Alton G. Bale, Jr., South Milwaukee, Wis., assignor to Wisconsin Electrical Manufacturing Company, Inc., Milwaukee, Wis., a corporation of Wisconsin Application November 29, 1957, Serial No. 699,571

10 Claims. (Cl. 249—2)

This invention relates to an automatic control for material delivery and distribution and particularly to a remote automatic control of the delivery of predetermined quantities of fluid-flowing materials from a bulk source.

In certain material handling applications such as involved in batch processes using fluid and other granular material, successive predetermined quantities of a material are drawn from a bulk source for use in the process.

Thus, in the making of concrete, predetermined amounts of sand and cement are mixed. The cement and sand are stored in large bins from which each is separately withdrawn in predetermined successive amounts, normally measured by weight. The receiving receptacle is normally coupled through a suitable transducer to an automatic control to close the discharge opening when the desired weight is received in the receptacle. The receptacle which receives the material from the bulk source is necessarily disposed some distance from the discharge opening. Consequently, after the gate closes, a column of free-falling material exists between the opening and the receptacle which proceeds to fall into the receptacle. It is therefore necessary to adjust the weight responsive means to account for this additional material which the receptacle receives in order to withdraw only the desired amount.

The amount of material withdrawn from the various storage bins or the like is also preferably remotely controlled from a convenient control center for all bins. Remote control of the amount of material which is delivered is conveniently obtained by comparing an input control signal and a material delivered signal which are connected in opposition to establish a command signal. The command signal actuates an electroresponsive means which controls the gate or the like which governs the discharge from the bin such that the material is permitted to flow until the command signal is reduced to zero or practically zero, as determined by the response of the electroresponsive means. Thus, when the material delivered signal equals or nearly equals the setting of the input signal, the gate automatically closes.

A simple and reliable control circuit for establishing opposing control voltages includes a pair of like potentiometers connected across the same power source. The movable tap of one potentiometer is coupled to the receiving receptacle through a suitable weight sensing means and is positioned in accordance with the weight of material deposited in the receptacle. The position of the tap is an indication of a quantity of material received. The other potentiometer and associated tap is located at any convenient control center and the tap is manually adjusted to establish a voltage corresponding to a predetermined quantity of material which is to be delivered to the receiving receptacle. The two taps are connected to a comparing circuit to compare the relative voltage levels and to establish a command signal whenever the input signal tap is at a higher voltage than the weight sensing tap. The command signal is connected to an electrically actuated gate control and as long as the set input signal is greater than the voltage established by the receiving receptacle, the gate remains open. As the weight in the receptacle increases, the tap moves to an increasing voltage level and when it reaches or immediately approaches the level corresponding to the input signal, the command signal is reduced to practically zero and the gate control returns the gate to closed position.

The present invention is directed to free-fall compensating means particularly adapted for employing opposed electrical signals to discontinue removal of material from a bulk source.

In accordance with the present invention voltage establishing means are provided to establish an input voltage signal and a cutoff voltage signal responsive to the weight of the material disposed within the receiving receptacle. Separate voltage establishing means are connected in series with the weight responsive voltage signal or the input voltage signal to change the relative potential of corresponding weight positions of the signal means by a predetermined voltage. The compensating voltage level is set corresponding to the weight of the free-falling column of material. Due to the added compensating signal to either the input signal or the cutoff signal, the weight-responsive signal reaches the input control signal level somewhat prior to actual receipt of a corresponding weight of the material. The gate then closes before the desired weight is actually received within the receptacle.

In a potentiometer and similar control circuit as previously described, a free-fall compensating potentiometer or other varying voltage device is connected in the weight responsive potentiometer circuit or in the input signal potentiometer. By varying the impedance inserted by the compensating potentiometer, the relative voltage of the weight responsive potentiometer and the input signal potentiometer is changed in accordance with the free-falling column of material. A voltage leveling adjustment potentiometer is connected in the opposite side of the compensated potentiometer and is adjusted in an opposite direction to maintain a constant impedance inserted in series with the weight responsive potentiometer. An impedance means is also inserted in the opposite potentiometer circuit, to maintain an equal voltage drop across the two signal potentiometers. However, the distribution of impedance to the opposite sides of the first potentiometer varies to selectively change the relative level of the successive potentials of that potentiometer.

The compensating potentiometer and the leveling potentiometer are adjusted to an intermediate value to shift the level of the weight controlled potentiometer with respect to the control input potential in accordance with the free-falling column of material. The circuit then establishes a premature cutoff of the feed to compensate for the free-fall column of material delivered to the receiving means.

The present invention is adapted to provide a simple and reliable control for automatic cutoff.

The drawing furnished herewith illustrates the best mode presently contemplated by the inventor for carrying out the invention.

The drawing is a schematic view and circuit of a material delivering system employing the present control.

Referring to the drawing, a main storage bin 1 contains a relatively large quantity of sand 2 or other material which is discharged through a bottom discharge opening 3. A suitable gate 4 normally closes the discharge opening 3 to retain the sand 2 within the bin 1.

The gate 4 is shown as a conventional jaw variety having a pair of channel shaped members pivotally secured to the walls of the discharge opening 3. The jaws of gate 4 are normally disposed immediately below the opening and are laterally swung from beneath the discharge opening to allow the material to fall freely from the bin 1 under the force of gravity.

A weighing hopper 5 is supported beneath the discharge opening 3 to receive the free falling sand.

The hopper 5 is coupled to a suitable scale 6 through a balance arm 7 thereof to vertically move in accordance with the weight in the hopper. The arm 7 is pivoted at an intermediate position on a fulcrum 8 and has a bifurcated end to establish a pair of arms 9 pivotally secured to diametrically opposite points of the hopper 5.

The scale 6 also includes a calibrated dial 10 which reads in suitable units of weight measurement or the like and a movable pointer 11 coupled to the free end of the balance arm 7 by any suitable means, not shown, for rotation in response to movement of the arm 7. A counter weight, not shown, is placed on arm 7 at the scale end to counterbalance the weight of the empty hopper 5 so the scale reads zero when the hopper 5 is empty. As the weight in hopper 5 increases, the pointer 11 moves across the calibrated dial 10 to show the weight in the hopper 5.

A discharge opening 12 having a jaw-type gate 13 similar to gate 4, is provided in the bottom of the hopper 5 to deliver the preselected quantity of sand from the hopper 5 to any suitable transporting medium, not shown, such as a belt, truck conveyor or the like.

An automatic control circuit 14 is provided to control the opening of the gate 4 to automatically deliver a predetermined quantity of material to the hopper 5. The automatic control circuit 14 generally includes an input signal branch 15 and a weight sensing means branch 16 which are connected in parallel with each other across a set of power lines 17 and 18. The signal branches 15 and 16 are adapted to establish a command signal to selectively actuate a control solenoid 19 which is coupled to the gate 4 to selectively open and close the bottom discharge opening 3.

The input signal branch 15 includes a potentiometer 20 and a voltage leveling resistor 21 connected in series directly across the power lines 17 and 18. The potentiometer 20 includes a tap 22 which slidably engages the potentiometer and establishes a potential directly proportional to the relative intermediate setting of the tap 22. Thus, if the tap is connected midway between the ends of the potentiometer, the voltage relative to either end of the potentiometer is equal to one-half the total voltage across the potentiometer 20. The potentiometer 20 is calibrated from a zero weight or percentage of weight at the left hand end of the potentiometer in the drawing to some maximum predetermined delivery weight corresponding to 100% weight at the opposite end of the potentiometer.

The potentiometer tap 22 is connected to the input of an amplifier 23 and biases the amplifier to conduct. The amplifier 23 is of any suitable variety such as a transistor-type which is rugged and reliable. A relay 24 includes a winding 25 which is connected in the output circuit of the amplifier 23 and which is energized whenever amplifier 23 conducts. An armature 26 of the relay 24 controls a set of contacts 27 which are connected in series with the solenoid 19 across a source of suitable operating power, shown for purposes of illustration as the control power lines 17 and 18.

The solenoid 19 includes an armature actuator 28 controlling a valve 29 connected in the fluid line of fluid motor 30 for regulating the position of the gate 4.

The fluid motor 30 includes a piston 31 in a tubular cylinder 32. Fluid lines 33 and 34 are provided at opposite ends of the cylinder and are selectively connected alternately to an incoming fluid line 35 and exhaust line 36 to move piston 31. A connecting rod 37 is secured at one end to the piston 31 and at the opposite end to one of the jaws of gate 4. The latter jaw is provided with an extended ear 38 and interconnected to the adjacent jaw by a link 39 pivotally connected thereto and to ear 38. Valve 29 is arranged to connect incoming fluid line 35 to line 34 and exhaust line 36 to line 33 to retract the piston 31 and connecting rod 37 to pivot the connected jaw of gate 4 from beneath discharge opening 3 when solenoid 19 is energized. As the jaw pivots, the ear 38 moves downwardly in an arc pushing on the link 39 and pivoting the opposite jaw outwardly from beneath the discharge opening 3. When solenoid 19 is de-energized, the armature actuator 28 moves the valve 29 to connect the lines 33 and 34 to the incoming fluid line 35 and exhaust line 36, respectively. The piston 31 and connecting rod 37 then move forwardly to close the gate 4 and close the discharge opening 3.

The input control signal of tap 22 is compared with a balancing voltage signal established by the weight sensor branch 16 in the following similar manner.

The sensor branch 16 includes a potentiometer 40 corresponding to potentiometer 20. The potentiometer 40 is connected across the power lines 17 and 18 and includes a tap 41 slidably engaging the potentiometer to establish a potential directly proporational to the relative intermediate setting of the tap. The potentiometer 40 is calibrated to establish arithmetically increasing potentials for similarly increasing weight of the hopper 5. A suitable coupling, not shown, connects the tap 41 to the scale pointer 11 to position the tap in accordance with the scale reading. If the scale reading is zero, the tap 41 is assumed to engage the left hand end of the potentiometer 40 in the drawing corresponding to the zero setting position of tap 22 on potentiometer 20. When the pointer 11 reaches full deflection, tap 41 moves to engage the opposite end, the right end in the drawing, of the potentiometer 40. Intermediate scale readings result in corresponding intermediate positioning of the tap 41.

The tap 41 is also connected to the input of the amplifier 23 but in a manner to bias the amplifier 23 to not conduct. Therefore, the amplifier 23 conducts only when the input signal as established by tap 22 is greater than the weight sensitive signal as established by tap 41. When the weight sensitive tap 41 is moved to establish a voltage essentially equal to the input voltage signal established by tap 22, the command signal from the amplifier 23 is discontinued and the gate 4 closes to stop further delivery of sand 2 from the bin 1 to the hopper 5. However, if similar potentiometers 20 and 40 are employed alone, a free-falling column 42 of the sand 2 exists between the gate 4 and the hopper 5 at the time of cutoff.

A free-fall compensating potentiometer 43 is connected between the power line 17 and the potentiometer 40 to insert an adjustable resistance in the circuit to the zero potential side of the weight sensing potentiometer 40. The potentiometer 43 includes a movable tap 44 which is connected directly to a common terminal 45 with the zero potential side of the potentiometer 40. By moving the tap 44, selected portions of the potentiometer 43 are short circuited to vary the resistance connected in the circuit.

A voltage leveling potentiometer 46 is connected between the potentiometer 40 and the power line 18 to insert resistance in series with potentiometer 40 complementing that of the potentiometer 43. The potentiometer 46 includes a movable tap 47 which is connected directly to a common terminal 48 with the potentiometer 40. The tap 47 is adjusted to short circuit selected portions of the potentiometer 46 to vary the resistance inserted in the circuit. The potentiometer taps 44 and 47 are arranged at opposite ends of the corresponding potentiometers 43 and 46, such that at zero settings thereof the potentiometer 43 is completely short circuited from the circuit while the potentiometer 46 is completely connected in the circuit. The taps are ganged in any suitable manner, shown diagrammatically in the circuit by the line 49, to simultaneously move the taps 44 and 47 in opposite directions such that as the one potentiometer inserts resistance in the circuit, the other potentiometer removes a corresponding resistance from the circuit. Consequently, the resistance inserted in series with the potentiometer 40 is maintained at a constant value and the voltage drop which exists across the potentiometer 40 is maintained at a constant value. The only difference is the degree of the level of the voltage which exists across the potentiometer 40 is shifted within the limits of the total voltage between the power lines 17 and 18.

The free-fall compensating potentiometer 43 and the voltage leveling potentiometer 46 have the same resistance as each other and as the voltage leveling resistor 21 in the input signal branch 15. Therefore, the total resistance inserted in the weight sensor branch 16 and in the input signal branch 15 is maintained equal. Consequently, the voltage drop across potentiometer 20 and across potentiometer 40 is always equal. The zero setting of potentiometer 20 is always maintained at the level of the power line 17 and as the tap 22 moves to the right, the voltage increases therefrom. However, the zero setting potential of the potentiometer 40 varies with the setting of the potentiometers 43 and 46 and as the tap 41 moves to the right, the voltage increases from this increased voltage. In this manner, the scale of the weight responsive potentiometer 40 is shifted to respond by a predetermined degree before the actual weight is received.

The operation of the apparatus is described as follows.

The operator first determines the weight of the material in the free-fall column 42, either by calculations knowing the material, the density thereof and the like or experimentally, as follows:

The potentiometer 43 is completely shorted from the circuit and a test delivery made with the tap 22 set at the predetermined position corresponding to the weight of the sand 2 to be withdrawn. This is necessary as the length of the free-fall column 42 varies with the quantity of sand 2 being withdrawn. After the gate 4 closes and the free-falling column 42 drops into hopper 5, the actual weight recorded by the scale 6 is noted and compared with the setting of the input tap 22. The differences between the setting of tap 22 and the reading of the scale 6 is the amount of material which existed in the free-falling column 42 and which dropped into the hopper 5 after the gate 4 closed.

The operator then adjusts the ganged potentiometers 43 and 46 to compensate for this predetermined weight.

The potential of tap 22 is then at a potential intermediate the potential of the incoming line voltage. The tap 41 of potentiometer 40 is at a zero reading and therefore at zero potential plus the potential of the compensating potentiometer 43 as determined by the placement of tap 44.

The input potential tap 22 is therefore at a higher potential than that of tap 41 and biases the amplifier 23 to conduct. The output or command signal from amplifier 23 energizes relay 24 and completes the energizing circuit to the solenoid 19 through the contacts 27. The solenoid 19 then positions valve 29 to retract the piston 31 and connecting rod 37 to open gate 4 which allows the sand 2 to drop by gravity from the bin 1 and into the hopper 5. As the sand 2 falls into the hopper 5, the weight thereof increases. As the weight increases, the hopper 5 moves downwardly and pivots the arm 7 about the fulcrum 8. The scale pointer 11 moves to record this increased weight. Simultaneously, the coupled potentiometer tap 41 moves along the potentiometer 40 from the zero setting and in an increasing potential direction. When the potential of tap 41 and the potential of tap 22 are essentially equal, the amplifier 23 no longer conducts and the relay 24 is de-energized and opens the associated contacts 27. Consequently, the solenoid 19 is de-energized and moves the valve 29 to extend the piston 31 and connecting rod 37 to move the gate 4 beneath the discharge opening 3 and prevent further movement of sand 2 from the bin 1.

If the scale 6 is viewed at the exact moment of shutoff, it is noted that the reading is somewhat less than the actual setting of tap 22. This difference is equal to the weight existing in the free-falling column 42. After the free-falling column 42 has completely dropped into the hopper 5, the reading of the scale 6 corresponds to the setting of the potentiometer tap 22.

Further, tap 41 moves to a correct scale reading incident to receipt of the free-falling column 42. The potential of tap 41 is now greater than the corresponding set input tap 22 by the voltage drop across the compensating potentiometer 43. The amplifier 23 is thus positively biased to cutoff and prevents hunting of the gate 4.

Although the compensating potential means are illustrated in the weight sensing control branch of the circuit, it may be incorporated in the input signal branch.

A potentiometer circuit is shown to establish the input and the cutoff signal for purposes of illustration. Other suitable voltage sources such as variable inductors, transformers or generators, may be employed to establish the control signals and a compensating potential means connected in circuit therewith to suitably adjust the relative characteristics of the signals in accordance with the free-falling column of material. The signal can be either an alternating current or a direct current.

Further, the device may be made responsive to any other continuous measurable quantity, such as volume through a suitable transducing means.

The present invention provides a simple and reliable circuit control for delivery of precise quantities of material from a bulk source.

Various modes of carrying out the invention are contemplated as being within the scope of the following claims particularly pointing out and distinctly claiming the subject matter which is regarded as the invention.

I claim:

1. An automatic control discontinuing the feed of material from a bulk source to a receiving means in response to delivery of a predetermined quantity of material, said receiving means being supported in spaced relation to the bulk source and receiving a constant quantity of material present between the source and the receiving means after cutoff for each weight setting, which comprises means adapted to selectively establish a series of electrical input signals corresponding to the quantity of material to be delivered from the bulk source, a second means adapted to establish like electrical signals and in proportion to the material received by the receiving means, means to compare said signals and to cutoff delivery from said bulk source in spaced relation to the receiving means incident to a predetermined relative relation therebetween, and adjustable means electrically in an operable circuit with said first and second named means to equally shift each of the one series of electrical signals with respect to the other electrical series in accordance with the quantity of material delivered to the receiving means subsequent to delivery from the bulk source.

2. An automatic control discontinuing the feed of material from a bulk source to a receiving means in response to delivery of a predetermined quantity of material, said receiving means being supported in spaced relation to the bulk source and receiving a constant quantity of material present between the source and the receiving means after cutoff for each weight setting, which comprises voltage signal means adapted to selectively establish a series of input voltage signals corresponding to the quantity of material to be delivered from the bulk source, a second voltage signal means adapted to establish a like series of voltage signals and in proportion to the material received by the receiving means, means to compare said signals and to cutoff delivery from said bulk source in spaced relation incident to a predetermined relative relation therebetween, and adjustable voltage means electrically in an operable circuit with one of said voltage signal means and adapted to be preset to establish a control voltage signal corresponding to a voltage signal established by both of said signal means for the quantity of material delivered to the receiving means subsequent to delivery from the bulk source to shift the series of voltage signals of the associated signal means by the level of the control voltage signal.

3. An automatic control discontinuing the feed of material from a bulk source to a receiving means in response to delivery of a predetermined quantity of material, said receiving means being supported in spaced relation to the bulk source and receiving a constant quantity of material present between the source and the receiving means after cutoff for each weight setting, which comprises voltage signal means adapted to selectively establish a series of input voltage signals corresponding to the quantity of material to be delivered from the bulk source, a second voltage signal means adapted to establish a like series of voltage signals and in proportion to the material received by the receiving means, means to compare said signals and to cutoff delivery from said bulk source in spaced relation to the receiving means incident to a predetermined relative relation therebetween, and adjustable voltage means operably connected in circuit with said second voltage signal means and adapted to be preset to establish a control voltage signal corresponding to a voltage signal established for a quantity of material corresponding to the quantity of material delivered to the receiving means subsequent to cutoff of material from the bulk source, said second voltage signal means changing each of the voltage signals of the second series of voltage signals by the magnitude of said control voltage signal to effect a premature cutoff of the feed of material from the bulk source to accurately deliver a preselected quantity of material to the receiving means.

4. An automatic control discontinuing the feed of material from a bulk source to a receiving receptacle in response to delivery of a predetermined quantity of material, said receiving receptacle being supported in spaced relation to the bulk source and receiving a constant quantity of the material present between the source and the receptacle after cutoff in spaced relation to the receiving means for each weight setting, which comprises an adjustable voltage generator adapted to establish a continuous series of voltage signals, a second voltage generator adapted to establish a similar series of voltage signals and coupled to the material receiving means to establish a signal corresponding to the material received, and an adjustable voltage source connected in series to the zero signal side with said second voltage signal means and adapted to establish a series of voltage signals corresponding to the potential difference within the absolute range of said series of voltage signals for any two-weight indicia to change potential level of the second voltage signal means with the same voltage difference between the maximum and minimum output signals of said second voltage signal means, said adjustable voltage source being set in accordance with the quantity of material delivered to the receiving means after the movement of material from the bulk source ceases.

5. An automatic control discontinuing the feed of material from a bulk source to a receiving means in response to delivery of a predetermined quantity of material, said receiving means being supported in spaced relation to the bulk source and receiving a constant quantity of the material present between the source and the receptacle after cutoff for each weight setting, which comprises a potentiometer means adapted to selectively establish any one of a continuous series of control input voltage signals, a potentiometer means adapted to selectively establish any one of a corresponding continuous series of cutoff voltage signals and being connected to the receiving means to establish a signal corresponding to the material received by the receiving means, and an adjustable potentiometer means connected in series with said second potentiometer means to maintain a constant voltage drop across the second potentiometer means and to increase the absolute value of the potential level of the output signals from the second potentiometer means whereby all normally corresponding positions of said second potentiometer means are changed by the same predetermined difference in accordance with the adjustment of the adjustable potentiometer means, said adjustable potentiometer means being set to equally increase the potential level of the second potentiometer in accordance with the quantity of material delivered to the receiving means after stopping of the feed from the bulk source in spaced relation to the receiving means.

6. An automatic control discontinuing the feed of material from a bulk source to a receiving receptacle by closing a gate means in response to delivery of a predetermined quantity of material, said receiving receptacle being supported in spaced relation to the bulk source and receiving a constant quantity of the material present between the source and the receptacle after cutoff from the bulk source for each predetermined quantity, which comprises a pair of similar potentiometers connected in a closed loop circuit and each having a movable tap establishing a pair of voltage terminals, a source of voltage connected to the opposite junctions of the potentiometers, means to set one of said taps between a minimum voltage setting and a maximum voltage setting in accordance with the weight of material to be delivered, means to couple the other of said taps to the receiving means and positioned from a minimum voltage setting to a corresponding higher voltage in response to delivery of a corresponding weight of material to the receiving means, variable impedance means connected between the minimum setting of the receiving receptacle controlled potentiometer and the adjacent input power junction of the weight responsive potentiometer, variable impedance means equal to said first named impedance means and connected between the maximum setting of the receiving receptacle controlled potentiometer and the adjacent input power connection, impedance means equal to each of said two impedance means and connected between the maximum setting of the input potentiometer and the adjacent input power junction, said two variable impedance means being oppositely adjustable to insert impedance equal to said last named impedance in series with said weight responsive potentiometer and to distribute the inserted impedance adjacent the minimum setting thereof in accordance with the material passing to the receiving means after discontinuing of feed from the bulk source, an electroresponsive actuator coupled to said gate means to control the flow of material from the bulk source, and voltage comparing means connected to said taps and adapted to actuate said actuator to maintain said gate means open until said taps are at essentially the same potential.

7. A control circuit for automatically closing a material delivery gate means in a storage bin to discontinue flow therefrom to a receiving receptacle disposed in spaced relation to said gate means, which comprises a cutoff potentiometer adapted to be connected to a source of power and having tap means adapted to establish a continuous series of voltages, weight sensing means adapted to operably couple the tap means to the material received by the receiving receptacle and to move the tap in proportion thereto, voltage comparing means connected to said tap and connected to said gate means to control the gate means, a free-all compensating potentiometer connected in series with said cutoff potentiometer adjacent the zero setting of said tap and having an adjustable tap adapted to short selected portions of the compensating potentiometer from the circuit to adjust the voltage inserted in series with the cutoff potentiometer, a voltage leveling potentiometer connected in series with said cutoff potentiometer adjacent the maximum setting of the cutoff potentiometer and having an adjustable tap adapted to short selected portions of the leveling potentiometer from the circuit, manually controlled means connecting the tap of said free-fall compensating potentiometer and the tap of said voltage leveling potentiometer for simultaneous opposite movement whereby a constant total impedance is inserted in series with the first named potentiometer, an input signal potentiometer adapted to be connected across the power source and having an adjustable tap connected to said voltage comparing means to oppose said weight responsive voltage signal, an impedance means having an impedance equal to the constant total impedance inserted in series with said cutoff potentiometer, and connected in series with said input signal potentiometer adjacent the maximum setting thereof to establish the same total impedance in each of the control branches connected across the power source.

8. A control circuit for automatically closing a discharge gate means in a storage bin to discontinue the flow of material from the bin to a receiving receptacle disposed in spaced relation to said gate means, which comprises an input signal potentiometer adapted to be connected to a power source and having an adjustable tap to establish an adjustable voltage terminal, a resistance means connected in series with said input signal potentiometer adjacent the maximum setting thereof, a cutoff potentiometer adapted to be connected to the constant voltage source in parallel with said input signal potentiometer and having a movable tap to establish an adjustable voltage terminal, weight sensing means operably coupling the tap of the cutoff potentiometer to the material receiving receptacle to move the tap in proportion to the weight therein, an amplifier having an input connected to said taps and biased to non-conduct by one of said voltages and to conduct by the other of said voltages, electroresponsive means to control the gate means, the output of the amplifier being connected to control the electroresponsive means to close the gate if the taps are at substantially the same potential and to open the gate means if the input signal tap is at a relatively higher potential, a free-fall compensating potentiometer connected in series with said cutoff potentiometer adjacent the minimum weight setting of said cutoff tap and having an adjustable tap adapted to short selected portions of the potentiometer from the circuit to adjust the voltage level of the cutoff potentiometer relative to the adjacent power terminal of the constant voltage source, a voltage leveling potentiometer connected in series with said potentiometer adjacent the maximum setting of said cutoff tap and having an adjustable tap adapted to short selected portions of the leveling potentiometer from the circuit, the total impedance of the compensating potentiometer and of the leveling potentiometer being equal to each other and to said resistance means, and manually controlled means connecting the respective taps of said free-fall compensating potentiometer and said voltage leveling potentiometer for simultaneous opposite movement of the taps whereby a constant total impedance is inserted in series with the cutoff potentiometer.

9. An automatic control for a feed means for feeding matter from a main source to a receiving means, said feed means delivering a predetermined quantity of matter to the receiving means subsequent to deactivation of the feed means, which comprises means to selectively establish a series of electrical input signals corresponding to the matter to be fed to the receiving means, second means to establish a series of like electrical signals in proportion to matter received by the receiving means, means to compare the signal established by said first means with the signal established by the second means and to deactivate said feed means incident to a predetermined relative relation between the signals, and selectively preadjustable means connected electrically in an operable circuit with said first and second named means to equally shift each one of series of electrical signals with respect to the other series of electrical signals in accordance with the matter delivered to the receiving means subsequent to deactivation of the feed means.

10. An automatic control for a feed means for feeding matter from a main source to a receiving means, said feed means delivering a predetermined quantity of matter to the receiving means subsequent to deactivation of the feed means, which comprises an input impedance device having a movable tap to selectively establish a series of electrical input signals corresponding to the matter to be fed to the receiving means, a sensing impedance device having a movable tap coupled to the receiving means to establish a series of like electrical signals in proportion to matter received by the receiving means, means to compare the signals established by the input impedance device with the signal established by the second impedance wire and to deactivate said feed means incident to a predetermined relative relation between the signals, a pair of control impedance devices connected in series circuit with electrically opposite sides of one of said impedance devices and having movable tap to simultaneously insert and remove a corresponding voltage from opposite sides of the series connected impedance device to equally shift each of the one series of electrical signals with respect to the other series of electrical signals in accordance with the matter delivered to the receiving means subsequent to deactivation of the feed means, and a balancing impedance device connected to the electrically high side of the opposite of the input and sensing impedance devices to balance the voltage inserted by said control impedance devices.

References Cited in the file of this patent

UNITED STATES PATENTS

| | | |
|---|---|---|
| 1,986,268 | Hughes et al. | Jan. 1, 1935 |
| 2,022,659 | Fisher et al. | Dec. 3, 1935 |
| 2,256,395 | Laub | Sept. 16, 1941 |
| 2,302,036 | Keeler | Nov. 17, 1942 |
| 2,581,205 | Reilly | Jan. 1, 1952 |
| 2,597,831 | Willis | May 20, 1952 |
| 2,610,052 | McGeorge | Sept. 9, 1952 |
| 2,630,007 | Howe | Mar. 3, 1953 |
| 2,728,285 | Bradley et al. | Dec. 27, 1955 |
| 2,868,491 | Thorsson et al. | Jan. 13, 1959 |